May 17, 1932. H. McCORNACK 1,859,213
APPARATUS FOR MILKING
Filed Nov. 22, 1923 7 Sheets-Sheet 1
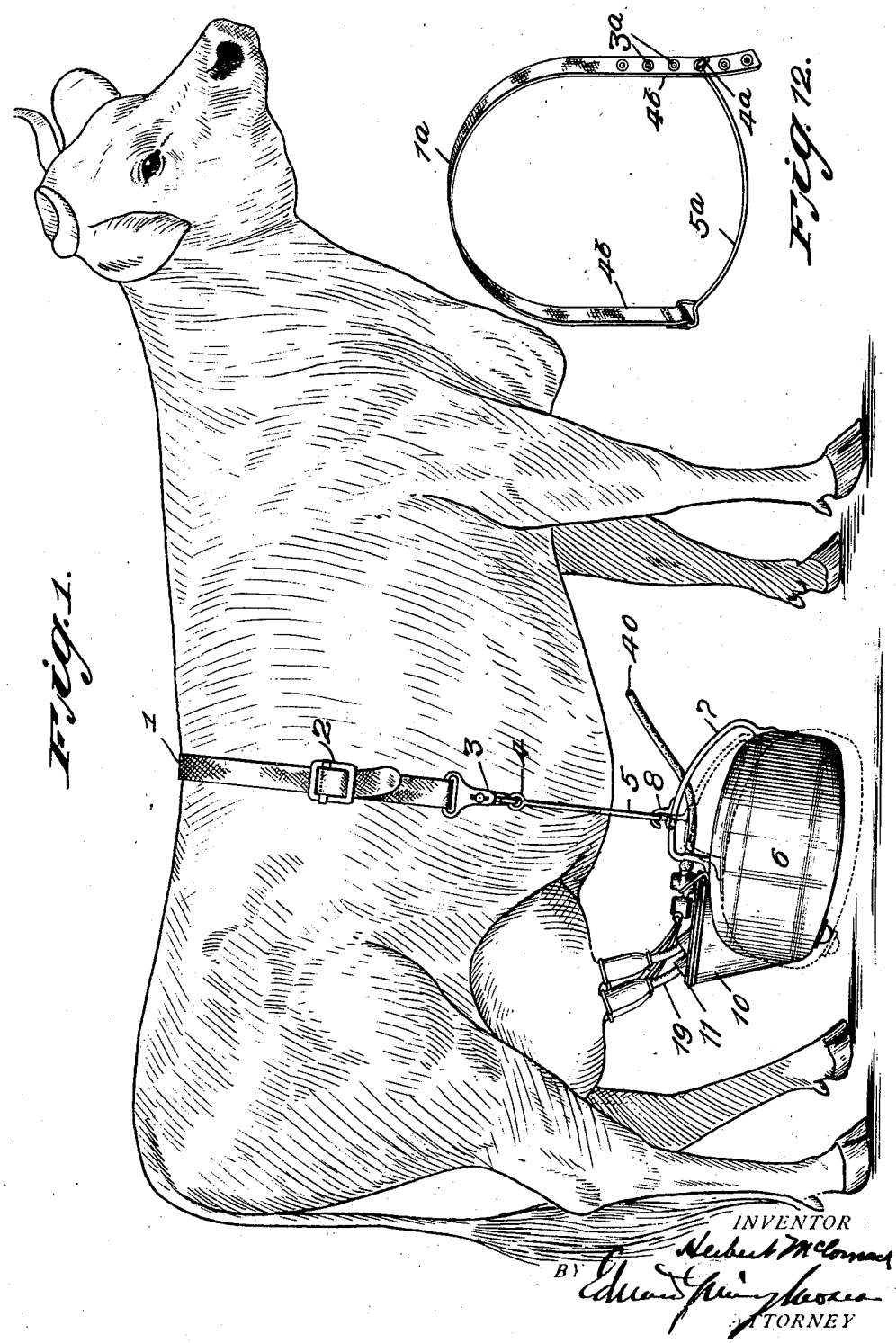

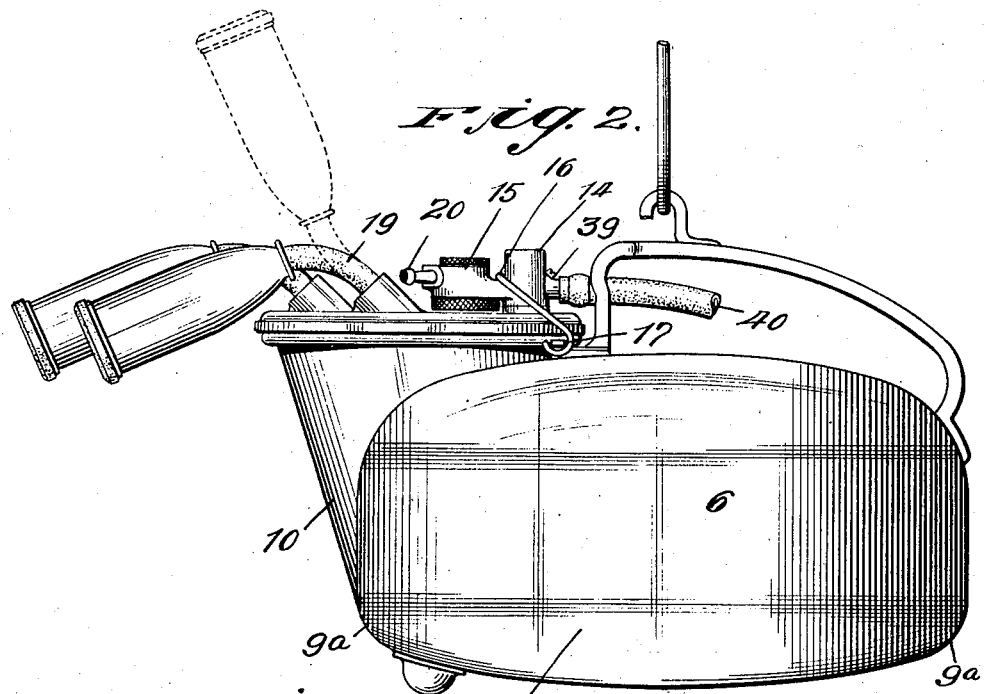
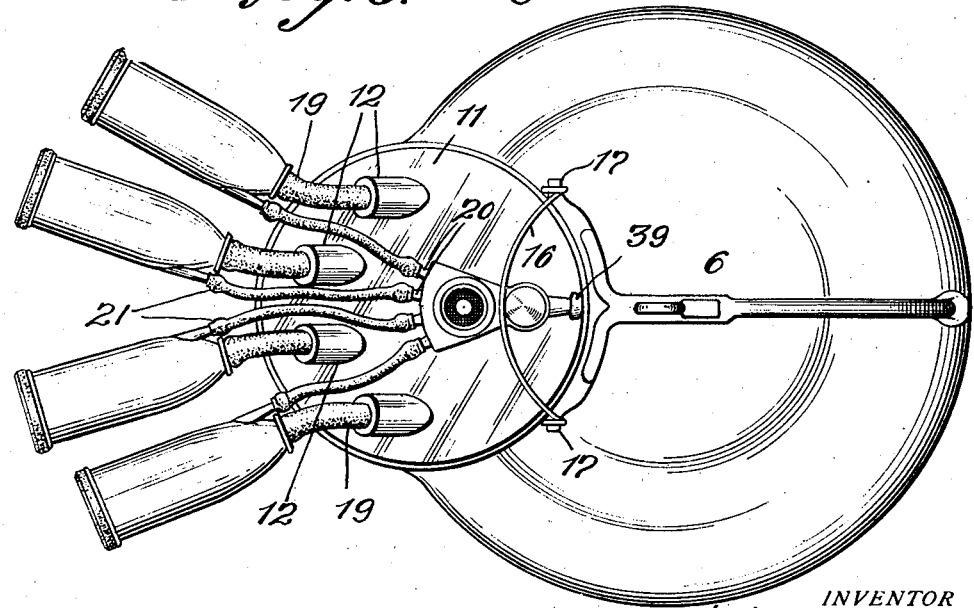

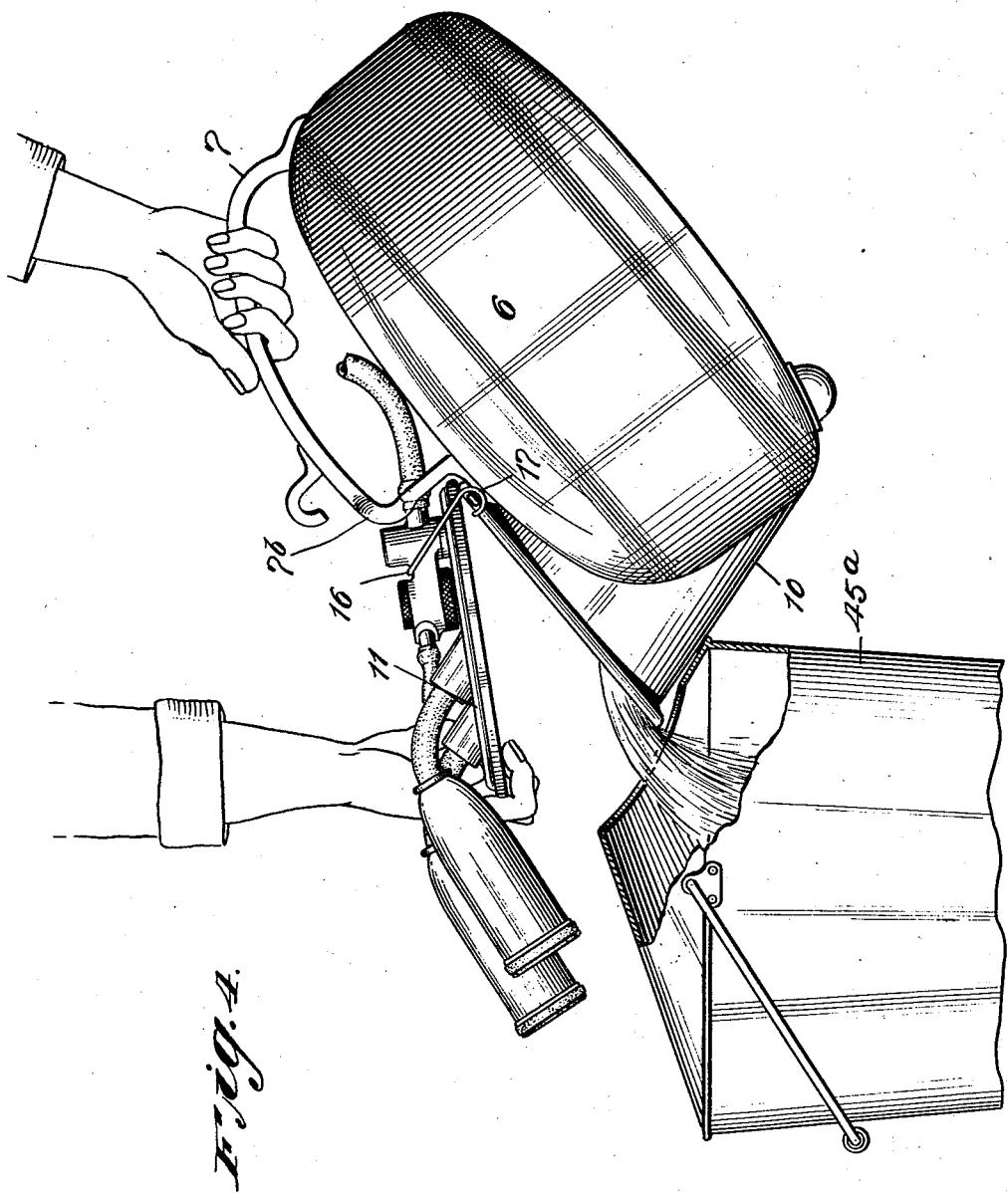

INVENTOR
Herbert McCornack
BY
ATTORNEY

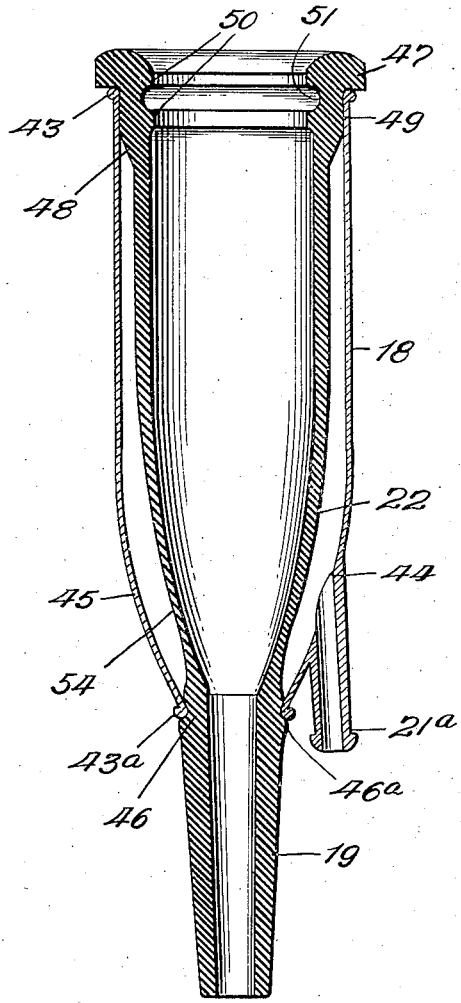
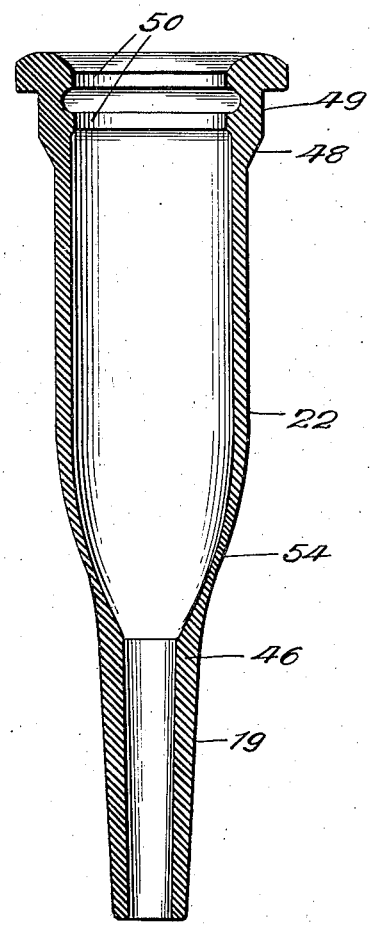

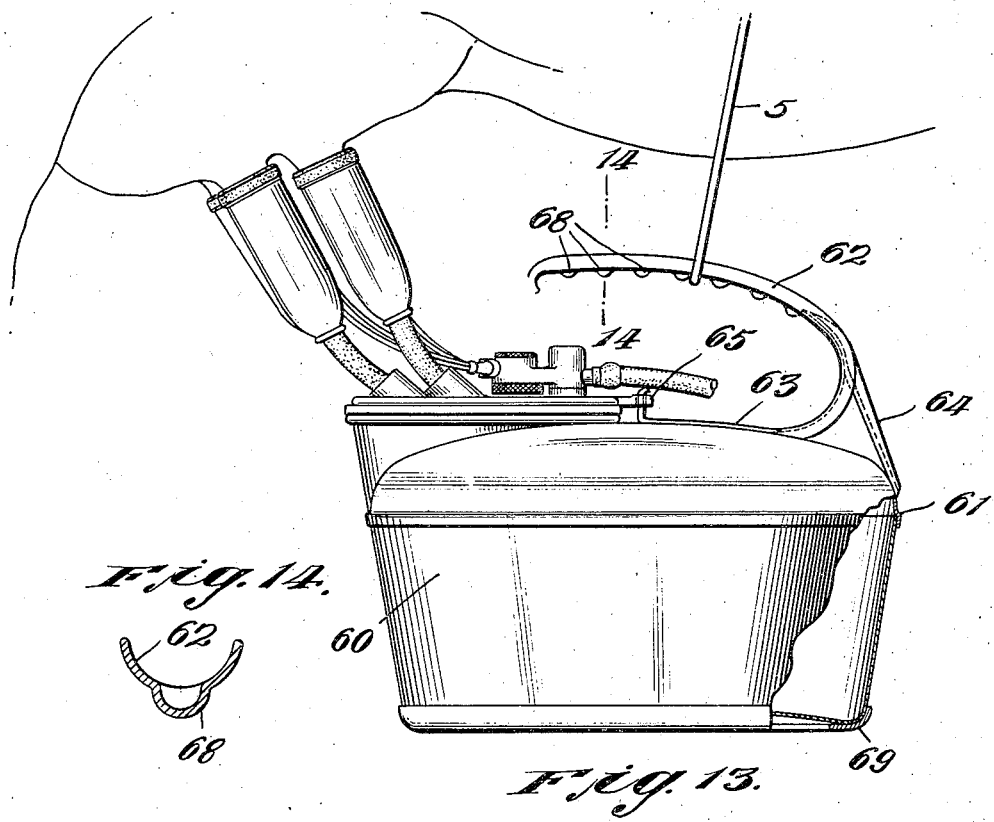
Fig. 14.
Fig. 13.
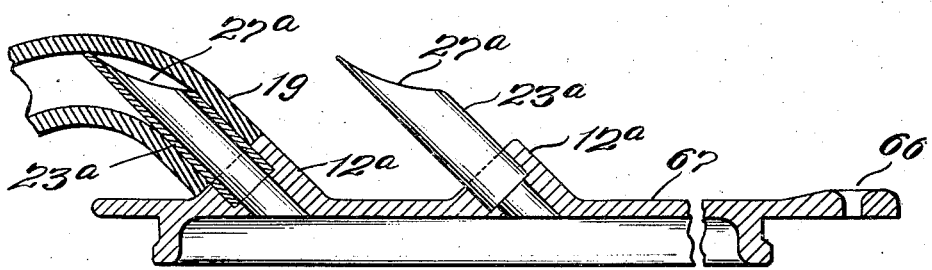
Fig. 15.

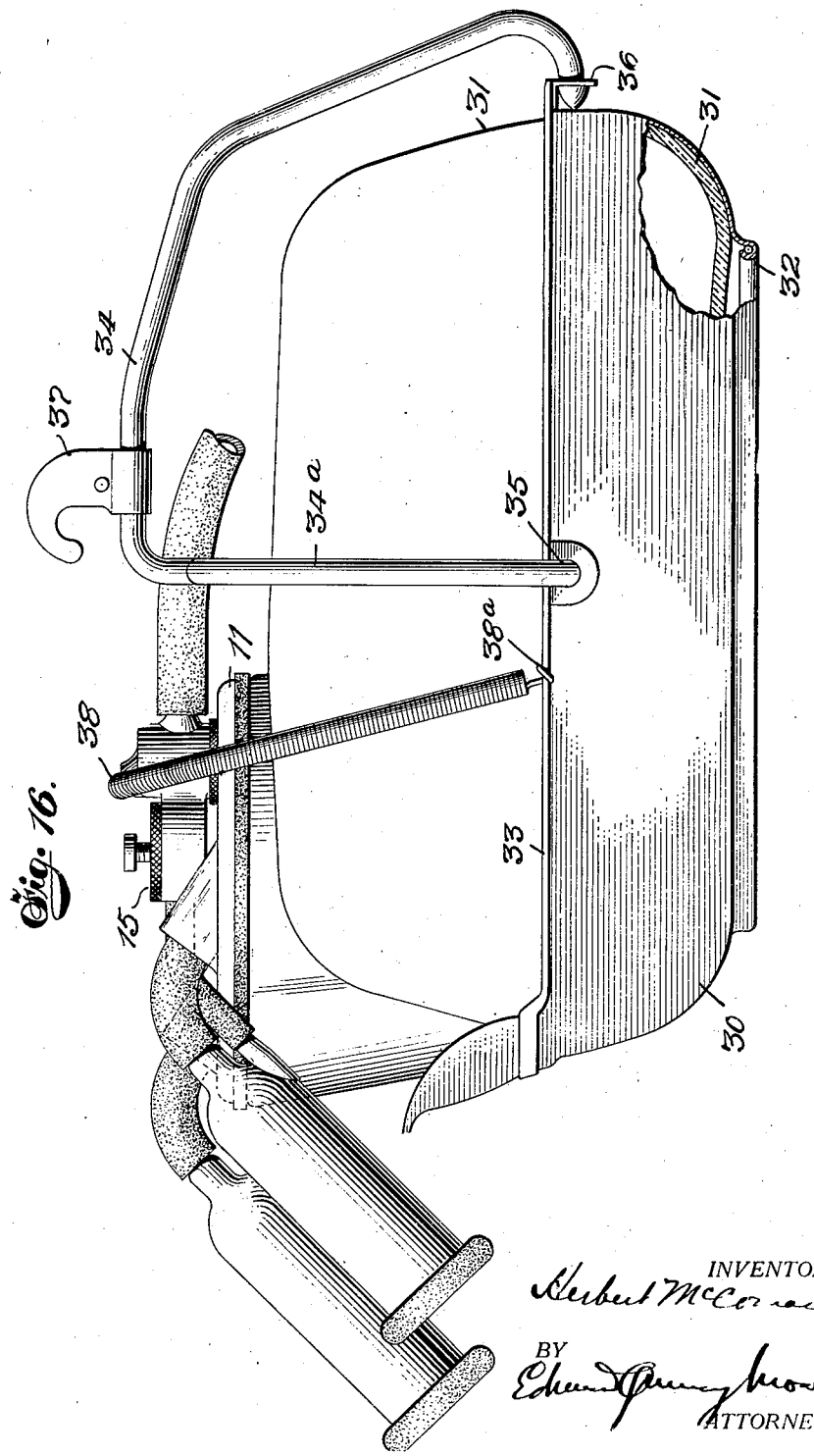

Patented May 17, 1932

1,859,213

UNITED STATES PATENT OFFICE

HERBERT McCORNACK, OF GLEN RIDGE, NEW JERSEY

APPARATUS FOR MILKING

Application filed November 22, 1923. Serial No. 676,241.

This invention relates to apparatus for milking and has for its objects various improvements in milking machines which will increase the milk yield, make the machine less likely to injure the cow, shorten the time required to extract the milk, simplify the application of the apparatus to and its removal from the cow, permit more accurate inspection of the milk flow, and facilitate cleaning and the maintenance of strictly sanitary conditions.

The novel method employed when using the apparatus of the present invention is not claimed herein, but is claimed in my pending application, Serial No. 529,273, filed April 10, 1931, for process of milking.

One serious fault of milkers of the suction type has been that no practical means has been provided for preventing the teat cups from being drawn upward until they tend to strangle the teats and shut off the flow of the milk and what is even more serious, stop the circulation of the blood resulting in injury to the udder. This strangulation of the teats takes effect more especially near the end of the milking when the udder begins to slacken and it interferes with the thorough milking of the cow.

One of the important features of the present invention is to provide effective means for preventing the teat cups from being thus drawn upward and strangling the teats. This is accomplished by providing for an increasing pull upon the teat cups as the milking progresses, preferably by utilizing the weight of the bucket and the increasing weight of its contents to offset or oppose the upward pull of the suction in the cups.

Milkers of the suction type heretofore used have also been open to the objection that there has been no effective means for agitating the udder corresponding to the rooting of the calf while it sucks, which is an important factor in stimulating the production and flow of the milk.

Another feature of the invention is to provide effective means for the agitation of the udder by suspending the milking apparatus and utilizing the weight of the bucket and the increasing weight of its liquid contents under the influence of the resilient and pendulous action of its support and the pulsations of the teat cups to set up a surging action upon the teats and udder. The pull upon the teats and udder and the surging action increase as the bucket fills so that the agitation is greatest when most needed, namely towards the latter part of this milking operation. Owing to the prevention of the strangulation of the teats and to the agitation of the udder, as above described, whereby the machine is caused to more nearly simulate in its action the sucking of the calf than has been the case with prior milkers, it is possible to permit the machine to strip the cow completely, if desired, thereby avoiding the necessity for hand stripping.

Another feature of the invention comprises an improved mode of attaching the cups and their connecting tubes to the bucket which provides effective means for preventing the cups from falling to the floor when becoming accidently detached from the teats and also provides for cutting off the vacuum from the teat cups when the cups are removed from the teats.

Another feature of the invention is the provision of means for adjustment of the elements of suspension to regulate the pull and balance of the bucket and adapt its application to the peculiarities of the teats and udders of different cows. This regulation is effected by any one or all of three different ways, (a) by adjusting the length of the suspender, (b) by adjusting the point of support on the back of the cow, (c) by adjusting the point of support on the handle of the bucket.

According to another feature of the invention I provide a glass lid on the milk bucket and direct the incoming streams of milk against the underneath side thereof, whereby the milker may observe the operation of the machine and know that it is working properly upon each teat and also observe the accumulation of milk in the pail.

Another feature of the invention comprises important improvements in the teat cup whereby the assembling and disassembling of the teat cup inflation and shell are greatly facilitated and provision is made for the maintenance of a hermetic seal at the lower opening of the shell under the varying stresses to which it is subjected by the surge of the bucket. The improved construction also facilitates the application of the cups to and their removal from the bucket. In the preferred form of the invention these results are accomplished by making the teat cup inflation integral with the short milk tube which connects it with the bucket, such tube being tapered downwardly as hereinafter more particularly described. The ability to assemble and disassemble the teat cup inflation and the milk tubes which receive the milk and convey the same to the bucket is of extreme importance in milking machinery because it is absolutely necessary, if sanitary conditions are to be maintained, that these parts be thoroughly cleaned after every milking. Such cleaning is greatly facilitated by the construction of the present invention.

Other features of the invention are in the improved design of the milk pail, the suspension means for mounting the same, the shape of the teat cup, the means for holding the teat cup tubes to the pail lid, and other improvements as will appear as the description proceeds.

Referring now to the drawings which illustrate a preferred embodiment of the invention:

Fig. 1 is a perspective view of a cow with the milker unit suspended therefrom.

Fig. 2 is a side view of the unit.

Fig. 3 is a plan view thereof.

Fig. 4 is a view illustrating how the milk is poured from the bucket.

Fig. 10 is a sectional view of the teat cup embodying part of my invention.

Fig. 11 is a sectional view of the lining or inflation removed from the casing.

Fig. 12 is a perspectve view of a modified form of surcingle.

Fig. 13 is a side view, partially in section, of a modified form of milker unit.

Fig. 14 is a sectional view on the line 14—14 of Fig. 13.

Fig. 15 is a part sectional view of the lid showing a modified form of nipple for attaching the teat cup tubes thereto.

Fig. 16 is a part sectional elevation of another form of milker unit.

Figure 5:
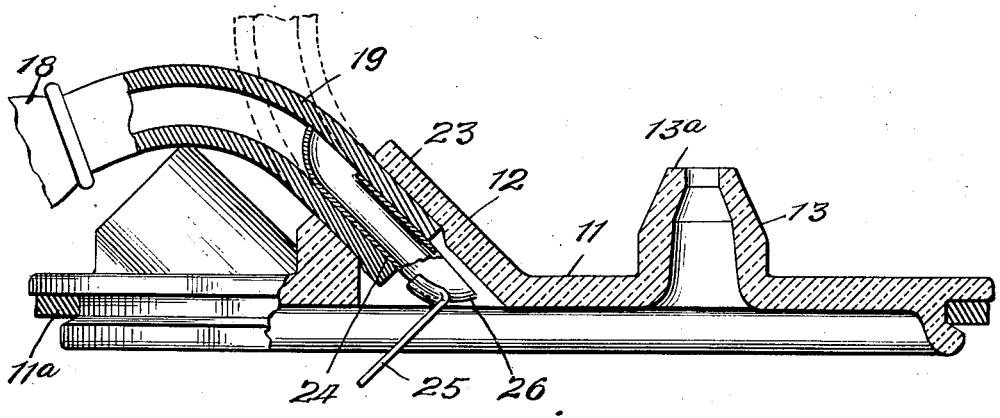
Fig. 5 is a cross section through the glass lid of the milker showing how the teat cup tubes are held therein.
Figure 6:
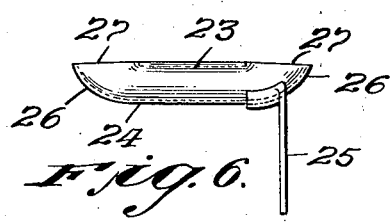
Figs. 6, 7 and 8 are respectively a side, plan and end view of one of the nipples by which the teat cup tubes are attached to the lid.
Figure 8:
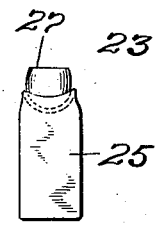
Figure 7:
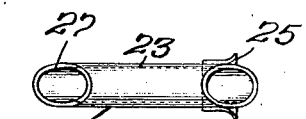
Figure 9:
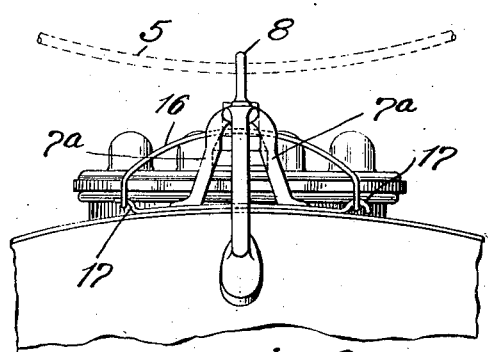
Fig. 9 is a detail elevation of a part of the bucket, lid and associate parts viewed from the direction of the head of the cow.

While the invention is not limited to suspended bucket milkers and many of the features thereof may be utilized in milkers of different types, the principal features of the invention are preferably embodied in the suspended bucket type of milker, in which the milk receiving bucket and its associated parts are suspended from the back of the cow being milked.

As illustrated in the accompanying drawings a bucket 6 is suspended beneath the cow by any suitable means, as for example, the strap or surcingle 1 extending over the back of the cow, and positioned on the back a little forward of the udder so as to pull the bucket toward the head of the cow. The surcingle 1 is provided with an adjustable buckle 2 whereby it may be adjusted to the different cows and for the desired position of the bucket, and it carries a snap 3 by which the end 4 of the bow 5 may be detachably supported. The bow 5 is resilient and is therefore adapted to be elongated by the weight of the accumulating milk in the bucket.

The suspending means described may be very quickly and conveniently transferred by the attendant from one cow to another. The attendant lifts the bucket off the bow, disconnects one end of the bow from the strap, and lifts the bow and strap from the cow which has been milked. He then seizes the bow substantially at its junction with the strap, reaches around the next cow's body from above, and passes the free end of the bow around to his free hand. He then connects the free ends of the bow and strap, hangs the bucket on the bow, and connects the teat cups ready for use. The provision of the bow makes this attachment of the support to the cow very easy and rapid.

The bucket 6 has a handle 7 with a hook 8 which hooks over the bow 5 to support the bucket thereon. In attaching the bucket to the bow the hook 8 may be hooked over the bow in any convenient position. The bucket when released will slide to the lowest part of the bow where it is suspended in proper position for milking. The pail comprises the body part 9 with rounded corners 9ª and the enlarged spout 10 big enough to reach in for cleaning, closed by the lid 11, which may be of glass or like transparent material, carrying the teat cup nozzles 12. The lid 11 may be molded with the nozzles 12 and pulsator nipple 13 integral therewith. The top 13ª of the nipple 13 may be ground to provide a smooth seat for the check valve of the pulsator 15. A ring 11ª of rubber or the like may be provided around the edge of the lid to form a fluid tight seal with the spout 10.

To facilitate the attachment of the teat cups to the teats, the teat cup nozzles 12 are preferably arranged in conformity to the normal arrangement of the cows teats, that is, the nozzles for the front teats are located in advance of the nozzles for the rear teats and have a greater spread than the nozzles for the rear teats, as illustrated in Fig. 3.

When assembled for operation the check valve casing 14 of the pulsator fits upon the nipple 13 and the pulsator 15, which may be of any suitable type as illustrated, for example in my co-pending application Serial No. 668,459 filed October 15, 1923, is retained upon the lid 11 by the spring bail 16 which is held at each end by the two lugs 17 on the handle 7. When pouring the milk from the pail as illustrated in Fig. 4, the bail 16 holds the front side of the lid 11 upon the bucket while the rear is lifted to permit the milk to flow out into the bucket 45ª. When the rear of the lid is released the lid drops back upon the spout 10 and the vacuum in the pail when in operation keeps it in position.

The inner chambers of the teat cups 18 are connected with the nozzles 12 on the lid by the flexible milk tubes 19, and the outer chambers are connected to the nipples 20 of the pulsator by the hose connection 21, so that the inner chambers in which the teats are inserted are subject to a continuous vacuum, while the outer chambers are alternately subjected to vacuum and atmospheric pressures to cause the inner walls of the teat cup to expand and contract to massage and relieve the teat in a well understood manner. Any suitable form of teat cup may be employed but preferably I use the form illustrated in Figs. 10 and 11 in which the milk tubes 19 form integral extensions of the teat cup inflations 22.

The numeral 18 in Figs. 10 and 11 designates the casing of the teat cup, which is preferably formed of metal or other relatively rigid material, and which receives the lining or inflation 22. The casing 18 is reduced at its lower end, and is preferably provided with beads 43 and 43ª around the upper and lower edges respectively. A nipple 21ª extends through the wall of the casing 44 and communicates with the outer chamber 45 which is formed between the casing 18 and the inflation 22.

The inflation 22, which may be formed of any suitable flexible non-porous material, preferably rubber, consists of the cup portion and an integral, preferably slightly tapered milk tube or nozzle portion 19. The diameter of the upper part 46 of the nozzle portion before insertion into the casing is preferably slightly greater than the diameter of the opening at 43ª at the lower end of the casing. In the particular embodiment shown the walls of the cup portion 22 are shaped at their upper end to form the flange or rim portion 47 which extends outward over the bead 43 of the casing 18 to hold the upper end of the inflation 22 in place therein. It will be understood, however, any other suitable means for anchoring the upper end of the inflation to the casing may be adopted.

Just below the rim 47 the outer wall of the inflation 22 is expanded by the bevel 48 to form the bearing portion 49 which fits snugly into the upper rim of the casing 1 so as to prevent the entrance of atmospheric air between the inflation 22 and the upper end of casing 18. On its inner walls, near the top, the inflation is provided with a pair of inwardly projecting ridges 50, which are spaced apart to form the groove 51. In use, the vacuum penetrates more or less into the groove 51 and sucks the skin of the teat thereinto to form a double seal over the inner surface of ridges 50 and causes the cup to cling tenaciously to the teat. As part of the skin of the teat is sucked into the groove 51, the cup is also prevented from creeping up on the teat as the milking operation progresses, thereby tending to prevent so much of the teat and adjacent parts of the udder being sucked into the cup as to cause strangulation of the teats and possible injury to the cow.

The walls of the inflation 22 are reduced in thickness at 54 and hence are more easily responsive to the variations in the milking pressure, so that the inflation may collapse completely to the tip when atmospheric pressure is admitted, thereby permitting pressure to be applied to the entire teat to prevent the lower end of the teat from becoming congested as sometimes occurs where the lower end of the lining is prevented from completely collapsing by a rigid nipple or attaching means.

In assembling the device, the inflation 22 is inserted into the casing 18 and the milk tube portion 19 pushed through the lower end of the casing. This is easily accomplished owing to the taper of the latter. The end of the milk tube 19 is then grasped in one hand and the casing 18 in the other and the inflation is pulled into the casing until the rim 47 rests firmly against the bead 43 at the upper end of the casing. In this operation the beveled portion 48 guides the bearing surface into snug engagement with the upper end of the casing.

The pull upon the milk tube 19 causes the walls of the cup portion 22 and of the milk tube 19 to elongate and be correspondingly reduced in cross section. The reduction in the diameter of milk tubes 19 enables it to be pulled farther through the lower end of the casing 1 than would otherwise be possible, and when the end of the milk tube is released, the part projecting beyond the lower end of the casing 18 springs back to form a sort of enlargement or ridge 46ª below the bead 43ª which forms an air tight seal and prevents the milk tubes 19 being drawn back into the casing, thus holding the inflation 22 in place under tension and in a more or less elongated shape. The ridge 46ª is sufficiently large to prevent the entrance of air between the rim of the teat cup casing and the milk tubes 19 due to any tendency of the milk tubes to be elongated and reduced by the pull of the milk pail thereon.

It is a feature of the cup that the diameter of the upper portion of tubes 19 is larger than the diameter of the lower end of the casing 18, so that no especial skill or care need be used in inserting the inflation into the casing so as to secure an air tight fit therebetween, as the mere pulling of the inflation into the casing insures such a fit.

Another features is the arrangement of the stiffening ridges 47 and 50 and the thickened portion 46 which make the inflation stiff enough at the top and bottom so as not to be collapsed by the vacuum, without necessitating the use of a lip or metal insert or clamp to fit over the bead 43 to hold the top of the cup open.

The lid 11 is provided with nozzle portions 12 into which the ends of the milk tube are inserted, after which the nipples 23 are pushed into the ends of the tube 19 to expand them firmly into engagement with the inner walls of the nozzles 12 and hold them to the lid. The nipples 23 consist of short tubular portions 24 with handles 25. The upper ends of the tubular portions are turned upward as indicated at 26 and are open at 27 so that in use, when the teat cups are connected to the teats, the milk tubes occupy a position as indicated by dotted lines in Fig. 5, the opening 27 is uncovered, and the vacuum in the pail 6 is communicated to the teat cups, but when the cups are disconnected from the teats the tubes 19 are pulled downward as in Fig. 5, by the weight of the cups to close the openings 27 and prevent loss of vacuum in the pail 6. This is a very valuable feature of the invention, as the action of the tubes 19 is automatic, and if a cup drops off the teat during the milking operation, the opening 27 to the teat cup is automatically closed to prevent the entrance of air into the pail through that cup.

Furthermore, in changing the bucket from one cow to the other, where it is not desired to empty the bucket between the milking of each cow, the transfer may be effected without loss of vacuum in the pail, as the removal of the cups from the teats of one cow automatically shuts off the vacuum to the teat cups until the cups are lifted to be applied to the teats of the other cow. The use of this automatic cut off dispenses with the milk cocks used heretofore to control the vacuum flow between the milk bucket and teat cups, and as the vacuum is communicated to the cup immediately, when it is raised, makes it easier to apply the cup to the teat.

Another valuable feature of the invention in this connection is that the milk tubes 19 may be made so short that if they do accidentally drop off the teat, they will not touch the floor and will not become contaminated with dirt or suck dirt through the teat cups and into the pail.

The lower upturned end 26 of the nipple 23 directs the incoming spurts of milk against the base of the transparent nozzle 12 of lid 11 where they are plainly visible. Thus the spurts for each operation of each cup can with certainty be observed and the proper action of the cups on each teat is assured.

To disassemble the device the bail 16 is unhooked from hooks 17 whereupon the pulsator is removed from the lid 11 and the lid removed from the bucket, the teat cup casing 18 is held in one hand, while the other hand pulls upon the rim 47 of the inflation 22. The inflation is first pulled out of the casing and the tube 19 is then pulled out of the nozzle 12 whereupon the nipple 23 drops out upon the table or into the cleaning vessel.

The integral inflation 22 and milk tube 19 is easily cleaned as it can be removed as a unit from the cleaning solution, a brush run one or more times through the inflation and tube and the job is completed, whereas with an inflation and tube comprising a number of separate parts, it is necessary to disassemble the parts, clean them separately and reassemble them, which prolongs the total time required for the milking and if some of the parts are not cleaned results in unsanitary milk.

A modified form of milk bucket is illustrated in Figs. 13, 14 and 15 in which a two piece bucket 60, joined together at 61 is provided with a cantilever handle 62 secured to the top of the bucket at 63 and to one side of the bucket by a brace 64. One end of the handle is provided with a hooked portion 65 which projects through a hole 66 in the lid 67 of the bucket and acts as a pivot for the lid, while the suspended portion of the cantilever is provided with a series of integral knobs or projections 68, formed as illustrated in Fig. 14, whereby the bucket can be suspended at different positions from the bow 5, to vary the pull of the teat cups upon the teats. When the bow 5 is near the projecting end of the cantilever the bucket will swing substantially level or tilt down slightly at the front, but when the bow 5 is located near the bend of the handle 62 the rear or nozzle portion of the bucket will tilt downward to exert a greater pull upon the teats. By thus shifting the position of the handle on the bow the pull of the teat cups upon the teats may be easily regulated. The knobs 68 also serve as a convenient hand grip when the bucket is being carried by the handle 62. A reenforcing member 69, around the bottom of the bucket, protects the edge thereof from indentation or other injuries.

In the modified form of lid illustrated in Fig. 15 the teat cup nozzles $12^a$ have the cutoff nipples $23^a$ permanently secured thereto in the position illustrated. The milk tubes 19 are attached by slipping them over the end of the nipples 23ª and into contact with the nozzle 12ª. The end 27ª of the nipple is shaped as illustrated to automatically cut off the vacuum to a teat cup if it accidentally drops off the teat or is removed therefrom.

Another form of milk bucket is illustrated in Fig. 16 wherein a metallic base 30 is used to support and protect a glass container 31. The base portion 30 is provided with a lower crimped rim or base 32 and an upper rim 33 to which the bail or handle 34 is attached. The handle has three arms attached respectively to the sides of the rim at the diametrically opposite points 35 and to the rear of the rim at 36. A hook 37 is provided for attaching the pail to the suspending means. The lid 11 and pulsator 15 are held upon the container by the coil spring 38 which is connected to the rim 33 of the support at 38ª. By making the container 31 of glass or other transparent material it is more easily kept clean and it is easier to detect the presence of dirt by looking through the transparent sides of the vessel.

The handles 7 and 34 are forked at the rearward end to provide the portions 7ª and 34ª between which the connection 40 to the vacuum line passes. In the case of the handle 7 the branched portion thereof at 7ᵇ in Fig. 4 may act as a stop to prevent the lid 11 and pulsator 15 from being tilted beyond a certain point when the milk is being poured from the bucket. The rearward portion of the handles 7 and 34 are directly over the center of gravity for the bucket so that the bucket may be conveniently carried without spilling the milk therein. When it is desired to empty the bucket the handle is grasped at the front and the bucket is easily tilted as shown in Fig. 4.

It is to be noted that in each bucket shown all corners are rounded so as to prevent the accumulation of dirt therein and the single opening in each bucket is sufficiently large for the insertion of the hand therein for cleaning the bucket.

In the modified surcingle illustrated in Fig. 12 the strap 1ª is attached at one end of the bow 5ª and at the other end is provided with a series of spaced holes or grommets 3ª through which the hooked end 4ª of the bow may be inserted to hold the strap upon the cow, the spacing of the grommets 3ª makes the adjusting of the strap to the different sized cows or to different heights more easy. The bows 5 and 5ª are preferably of substantially the same length as the breadth of the cow so that the ends of the strap hang vertically downward from the sides of the cow as indicated at 4ᵇ in Fig. 12.

In the operation of the device illustrated in Fig. 1 the surcingle 1 is adjusted to the cow to be milked and the bucket 6 is hooked over the bow 5. The hook 8 provides a swivel mounting for the bucket 6 upon the bow 5 so that the bucket may turn to adjust itself to inequalities in the length of the teats or of the tubes 19. The teat cups 18 are applied to the teats and the vacuum existing in the bucket applies suction immediately to the teats to draw them the proper distance into the cup and start the milking. At the same time the pulsator 15 causes alternate periods of suction and atmospheric pressure in the outer chamber of the teat cups which causes the walls thereof to expand and contract to massage and relieve the teats. The alternate pulsations of the pressure in the outer chamber of the teat cups causes the bucket 6 to start swinging back and forth in synchrony with the pulsations to exert an intermittent pull and push upon the teats through the tubes 19 and teat cups, which simulates the rooting action of the calf and induces the cow to give down her milk more rapidly than with machines as heretofore operated. As the milk accumulates in the pail the swinging movement of the pail is communicated to it so that it surges back and forth as the pail swings and acts as a balancer to equalize and regulate the swings.

The accumulation of milk increases the weight on the spring support for the bucket and causes it to extend and let the pail hang a little lower as illustrated by the dotted line position of the pail in Fig. 1, so that a greater pull is exerted upon the teats toward the end of the milking operation. This increased milking power toward the end, together with exciting movement of the cups on the teats causes the cow to be effectively stripped of her milk whereby hand stripping after the milking machine is removed from the teats may be dispensed with thereby increasing the yield from the milking machine and conserving the time of the milker.

I have found that by the use of this machine, not only is the cow stripped more completely of her milk than with the prior milking machines, but that the swinging movement of the bucket which is synchronated with the pulsations or periods of suction in the teats, and the intermittent pull of the cups on the teats induces a cow to give down her milk more freely so that the machine milks faster and can be operated on a lower vacuum than the prior machines whereby the strain on the teats due to prolonged milking and the pull of the vacuum on them is reduced and there is less likelihood of injuring the cow.

Another advantage resulting from the use of my milker is that the stripping of the cow by the machine is part of the milking operation, whereas in the use of machines where hand stripping is necessary the stripping may not be done for several minutes which interrupts the milking and increases the nervous strain upon the cow.

Another, and very important advantage of my machine is the ease of assembling and disassembling for the purpose of cleaning the parts which come in contact with the milk, namely, the inflations 22 and integral milk tubes 19, the lid 11, nipples 23, and bucket 6. It often happens in the use of prior milkers that various small parts thereof which are difficult to assemble or disassemble are not cleaned by the attendant after each milking. However, with the present milker, the separation of the larger parts automatically separates the smaller parts, whereupon the metal portions may be dropped into one cleaning solution and the rubber parts into another. The attendant, therefore, has no reason for failing to clean all milk contacting parts of the milker at each milking operation.

While I have shown one form in which the invention may be embodied, it is to be understood that the construction shown may be modified in many respects without departing from the spirit of the invention, and that it is my intention to cover all such modifications in the appended claims. The method described and claimed may be carried out by other apparatus, without departing from the scope of the method claims which are intended to cover the steps of the method regardless of the apparatus used.

What I claim is:

1. In a milking machine of the class described, the combination of a bucket, means for supporting the bucket from the animal at a point horizontally offset from the udder including a resilient means which will permit the support to be elongated by the weight of the milk as it accumulates in the bucket, and a universal connection between the resilient means and the bucket, and flexible tension means connecting the bucket to the cow's teats so that it will be partially supported by the teats.

2. In a milking machine of the class described, the combination of a bucket adapted to be supported in part from the animal's teats, a strap to fit over the animal's back, a bow supported beneath the animal's body by the strap, means to attach the bucket to the bow and suspend it therefrom, with capacity for sliding, rocking and twisting movement, and flexible tension means to suspend the bucket also from the animal's teats in such manner that the teats are subjected to a tugging action.

3. In a milking machine of the class described, a bucket suspending means comprising a strap to fit over the animal's back, a bow connected at one end to one end of the strap and having a hooked free end and a series of holes near the other end of the strap in which the hooked end of the bow may be adjustably attached.

4. In a milking machine of the character described, the combination with a milk receiving bucket carrying teat cups, of means for pivotally suspending the bucket from the cow's back in front of the udder and at a point above the center of gravity of the bucket and nearer the head of the cow than the center of gravity of the bucket when the teat cups are attached to the cow's teats, whereby the weight of the bucket will be caused to exert a downward and forward pull on the teats during the milking operation, but the bucket will not be caused to capsize if detached from the teats.

5. In a milking machine of the character described, the combination with a milk receiving bucket carrying teat cups, of means for suspending the bucket from the cow's back at a point nearer the head of the cow than the center of gravity of the bucket when the teat cups are attached to the cow's teats, whereby the weight of the bucket will be caused to exert a pull on the teats during the milking operation, said suspending means being constructed to yield and swing forward under the increasing weight of the milk which accumulates in the bucket during milking so as to increase the pull upon the teats, and flexible tension tubes transmitting the pull from the bucket to the teats.

6. In a milking machine of the character described, the combination of a milk receiving bucket, means for pivotally suspending the same under the cow in advance of the cow's udder, teat cups connected to the bucket, the connections between the teat cups and the bucket being flexible and of such length that when the cups are attached to the teats the bucket is swung upwardly and rearwardly from the normal freely hanging position which it would otherwise occupy when the suspending means is in operative position, and means for inducing forward and rearward swinging movement of the bucket toward and from the udder during milking.

7. In a milking machine of the character described, the combination of a milk receiving bucket, means for suspending the bucket beneath the cow in such a manner that it is free to swing longitudinally of the cow, double chambered teat cups connected to the bucket, means for evacuating the bucket, and means for producing pulsations in the outer teat cup chambers, the connections between the teat cups and the bucket being flexible and of such length that when the teat cups are applied to the cow's teats the bucket is swung rearward from the normal pendulous position which it would otherwise occupy when the suspending means is in operative position so as to exert a pull upon the teats.

8. In a milking machine of the character described, the combination of a suspending device supported on the cow's back, a milk receiving bucket having a point suspension from said suspending device in front of the udder so as to be free to swing on said device, and teat cups connected to said bucket, said bucket being supported jointly from said point suspension device and from the teat cups when attached to the teats during the milking operation, but being otherwise without support.

9. In a milking machine of the character described, a surcingle adapted to pass over the cow's back, a bail passing under the cow's belly and supported at its ends by said surcingle, a milk receiving bucket having a hook thereon freely engaging said bail, teat cups, and short flexible tubes connected directly to said teat cups and to the bucket in such manner that the bucket is supported in part from the teats through the tubes, in such manner that the teats are subjected to a tugging action.

10. In a milking machine of the character described, the combination of a milk receiving bucket, means for suspending the bucket beneath the cow's belly from a single point so that it may swing in any direction, teat cups, and short tension milk tubes of flexible material forming a direct connection between the teat cups and the bucket and distributing a portion of the weight of the bucket to the teats, in such manner that the teats are subjected to a tugging action.

11. In a milking machine, the combination of a milk receiving bucket, a removable transparent lid of glass or the like fitting thereon, teat cups, individual milk tubes for each teat cup connected to said transparent lid at spaced points, and means for directing the incoming streams of milk against the under side of the lid.

12. In a milking machine of the class described, the combination of a milk receiving bucket, a transparent lid, milk tubes, openings in the lid to receive the milk tubes and means inserted in the ends of the milk tubes to direct the incoming milk streams against the underside of the lid.

13. In a milking machine of the class described, the combination of a milk receiving bucket, means for suspending the same beneath the cow, means to evacuate the bucket, teat cups flexibly connected to the bucket and arranged to transmit the weight of the bucket to the teats, communicating passages between the teat cups and the bucket, and means in each passage to automatically shut off the vacuum to the connected teat cup if the cup comes off the teat.

14. In a milking machine of the class described, the combination of a milk receiving vessel having holes therein, milk tubes projecting into the holes from the outside and valve means projecting into the ends of the milk tubes from the inside for sealing the tube from the vessel when the tube is open to the atmosphere.

15. In a milking machine of the class described, the combination of a milk receiving vessel having holes therein, milk tubes projecting into the holes from the outside and valve means projecting into the ends of the milk tubes from the inside for sealing the tube from the vessel when the tube is open to the atmosphere, said valve means comprising a tubular portion with upturned ends and a handle secured near one end of the tubular portion.

16. In a milking machine of the character described, the combination of suspending means and a milk receiving bucket adapted to be supported thereby beneath the cow's body, said bucket having an opening in the top thereof closed by a lid, and having a handle fixed on the bucket independently of the lid and extending longitudinally above the bucket from the side opposite the lid to a point above the center of mass of the bucket, by which the bucket may be carried and poured, said handle and suspending means having interengaging members for hooking the bucket on the suspending means with freedom for fore and aft swinging.

17. In a milking machine of the character described, the combination of suspending means and a milk receiving bucket adapted to be supported thereby beneath the cow's body, said bucket having an opening in the top thereof closed by a lid, and having a handle fixed on the bucket independently of the lid and extending longitudinally above the bucket from the side opposite the lid to a point above the center of mass of the bucket, by which the bucket may be carried and poured, said handle being also provided with means for engagement with the bucket suspension means to effect pivotal suspension of the bucket from any one of a series of points longitudinally of the handle.

18. In a milking machine of the character described, means for suspending a bucket beneath the cow and a bucket adapted to be suspended thereby having an opening in the top thereof near the rear of the bucket and a fixed handle extending longitudinally above the bucket from near the front of the bucket to a point beyond the center of gravity of the bucket, a lid for covering said opening having a detachable pivotal connection with the bucket and teat cups attached to said lid.

19. In a milking machine of the character described, a milk receiving bucket, means for suspending the bucket beneath the cow, teat cups comprising teat cup shells and inflations removably mounted in said shells, said inflations having integral flexible tube portions detachably connected directly with said bucket and discharging the milk directly thereinto, means for evacuating the bucket, and means for producing pulsations in the teat cup shells.

20. A suspended milker unit comprising a milk receptacle, and a supporting member permanently secured thereto and adapted to universally engage a suspending device, said member being above the center of gravity of the bucket and formed to fix the point of suspension in front of the center of gravity of the bucket, but so nearly in vertical alignment therewith that the bucket assumes a substantially upright position by its own weight when attached to the cow.

21. In a suspended milker unit, in combination, a milk receptacle, and means attached thereto and defining a single suspension point for the receptacle above the top of the receptacle and offset a little to the front of the center of gravity thereof.

22. A suspended milker unit apparatus comprising a suspending means, and a bucket adapted to apply a portion of the weight of the bucket to the teats, said suspending means including means for causing the bucket to be moved automatically by its own weight, substantially to the center of the cow's belly.

23. In a milking machine of the class described, the combination of a milk receiving bucket, means for suspending the bucket beneath the cow's body, double chambered teat cups including shells, and inflations of flexible material in the shells, and short, flexible tension milk tubes integral with the inflations and forming a direct connection between the teat cups and the bucket, and distributing a portion of the weight of the bucket to the teats, in such manner that the teats are subjected to a tugging action.

24. In a milking machine, the combination with a set of teat cups adapted to be attached to the cow's teats, of flexible milk tubes connected with the teat cups, and a pendulously swinging, weighted member for applying a pulsating downward and forward pull through the milk tubes and the teat cups to the cow's teats.

25. In a milking machine, the combination with a set of teat cups adapted to be attached to the cow's teats, of flexible milk tubes connected with the teat cups and extending downward and forward therefrom, a suspension device hung from the cow's back in advance of the udder, a pendulous weight supported at one side of its center of gravity by said suspensions device and at the other side of its center of gravity by the udder through the teat cups and the milk tubes, and means for causing said pendulous weight to pull intermittently in a downward and forward direction upon the milk tubes.

In testimony whereof I have affixed my signature to this specification.

HERBERT McCORNACK.